United States Patent [19]

Peterson

[11] 4,255,741

[45] Mar. 10, 1981

[54] COMMUNICATION MODULE

[76] Inventor: Erik R. Peterson, 11711 NE. 67th Pl., Kirkland, Wash. 98033

[21] Appl. No.: 97,401

[22] Filed: Nov. 26, 1979

[51] Int. Cl.³ .............................................. H04B 1/58
[52] U.S. Cl. .......................... 340/147 R; 340/147 SY
[58] Field of Search ....... 370/86; 340/147 R, 147 LP, 340/147 SY

[56] References Cited

U.S. PATENT DOCUMENTS

| 3,812,468 | 5/1974 | Wollum et al. | 235/153 X |
|---|---|---|---|
| 3,879,582 | 4/1975 | White et al. | 370/86 |
| 3,958,111 | 5/1976 | Hackett | 235/153 AK |
| 4,010,450 | 5/1977 | Porter | 340/172.5 |
| 4,035,770 | 6/1977 | Sarle | 340/147 R |

Primary Examiner—Harold I. Pitts
Attorney, Agent, or Firm—Graybeal & Uhlir

[57] ABSTRACT

A loop circuit interface module enabling a plurality of data terminals remote from each other and from a central controller to communicate with each other and the central controller over a plurality of data channels interconnecting same is disclosed. The loop circuit interface module comprises a plurality of data ports for inputting data from either the loop controller or another loop circuit interface module. The data ports also output data to the loop controller or another loop circuit interface module. The module has a plurality of signal ports for inputting data from the data terminal and for outputting data to the data terminal. A bridging means provides a matched impedance between the loop circuit interface module, the loop controller, and the data terminals. The bridging further provides gain to the data at the plurality of ports. Switching means selectively and controllable connects the plurality of data ports and the plurality of signal ports directly to each other, or to each other through the bridging means.

21 Claims, 4 Drawing Figures

COMMUNICATION MODULE

FIELD OF THE INVENTION

The present invention relates in general to data communication systems, and more particularly, to communication modules for use in loop type data communication systems.

BACKGROUND ART

Communicating data or other information between a central location and remotely located data terminals, such as automatic bank teller machines or the like, using conventional telephone lines or data channels is old in the art. A configuration used to provide such communication capability utilizes serially connected unidirectional or simplex data channels between each remotely located data terminal. The first and last data terminals were subsequently connected to the central location to form a serial, closed loop communication system. The success of this configuration require the continued serial operation of a number of components; including, each data channel, each remote terminal, and the electronic circuitry at each termination of the data channel used to modulate and demodulate the data on the data channel. A failure of any one of these components rendered the entire configuration inoperable. Because remote terminals may be widely distributed within a particular location, as for example, at different geographical locations within a city, the common carrier providing the simplex data channels may regard each remote data terminal as a separate and independent data circuit. As such, remedial service for this serial configuration may be provided by numerous field personnel from the common carrier based at the geographic location of each remote data terminal. Thus, a configuration with N data terminals may require N different service locations to isolate a failure to a particular data channel or a particular remote data terminal, or to satisfactorily demonstrate that all data channels are operating correctly.

Regardless of a common carrier's ability or inability to provide field service personnel to identify and resolve problems, a significant disadvantage of this serial, closed loop configuration is the lack of a central point from which all data channels emanate, or to which all data channels arrive. A simple continuity test verifying the integrity of the closed loop configuration becomes virtually impossible to perform from a single central location. Thus, fault identification and isolation becomes slow and cumbersome, and restoration of the communication configuration must await identification and repair of all the failed components.

Another configuration solving the problems of the aforementioned serial, closed loop configuration interconnected each remote data terminal to the central location with a bidirectional or duplex data channel. Adjacent remote data terminals were interconnected to each other essentially by interconnecting the transmit and receive portions of adjacent data channels. However, interconnecting adjacent remote data terminals cannot be accomplished by simply interconnecting the transmit and receive portions of adjacent duplex data channels. This is partially due to the fact that the remote data channels provided by the common carrier attenuate the data propagated along the data channel. In addition, an impedance mismatch may occur between the remote data terminal internal electronics and the characteristic impedance of the data channel making such a direct interconnection virtually impossible. To more effectively utilize the duplex configuration, an active and sophisticated device or communication module must provide the interface between adjacent remote data terminals, the data channels, and the central location.

The present invention provides such a communication module. By having a plurality of data and signal ports, the present invention provides the requisite interfaces for both the remote data terminal and a loop controller within the central location. Circuitry within the module ensures the data propogated along the data channel interfaces with either an associated data terminal, another communication module, or the loop controller. A switching means provides a capability to easily and quickly switch around a failed component so that data communications with other remote data terminals may be continued. Finally, means within the present invention provides a capability to identify the location within the duplex loop configuration at which point a failure has occurred.

Sarle, U.S. Pat. No. 4,035,770 discloses, in part, a switching system for use with a plurality of data terminals connected in series in a loop. The disclosed system does not regenerate the data communicated for subsequent transmission to another data terminal, or another like system, nor does the reference provide a diagnostic capability to identify the point and component at which a loop failure has occurred. The patent to Hackett, U.S. Pat. No. 3,958,111 discloses a commandable diagnostic controller to autonomously simulate data received over an out-of-service data path. The disclosed system provides for a remote device which interfaces redundant data paths, and performs and reports a number of remote tests of digital switching apparatus along one of those data paths. The disclosed system does not provide for the transmission of information, nor does the reference detect impairment in the data channel or provide means for testing the data channel itself.

SUMMARY OF THE INVENTION

According to one aspect of the present invention, the loop circuit interface module enabling a plurality of data terminals remote from each other and from a central controller to communicate with each other and the central controller over a plurality of data channels interconnecting same comprises a plurality of data ports. The data ports input data from either the loop controller or another loop circuit interface module, and output data to the loop controller or another loop circuit interface module. A plurality of signal ports inputs data from the data terminal and outputs data to the data terminal. Bridging means provides a matched impedance between the loop circuit interface module, the loop controller, and the remote data terminals. The bridging means further provides gain to the data on either plurality of ports. Switching means selectively and controllably connects the plurality of data ports and the plurality of signal ports directly to each other, or to each other through the bridging means.

An object of the present invention is to provide a communication module enabling a plurality of remote data terminals to communicate with each other and with a central controller over a communication data loop interconnecting same.

A further object of the present invention is to provide a communication module enabling a plurality of remote data terminals and a central controller to communicate with each other in the presence of a failure in a remote data terminal by providing a data path around the failed data terminal.

A still further object of the present invention is to provide a communication module having a capability to identify the point in a loop type communication system at which a failure has occurred.

A still further object of the present invention is to provide a standardized communication module replaceable with like communication modules used in any loop type communication systems.

A still further object of the present invention is to provide a communication module compatible with a common carrier supplied data channel.

These and other objects, features, and advantages of the present invention will become more apparent in light of the detailed description of the preferred embodiment set forth hereafter, and illustrated in the accompanying drawings.

BEST MODE OF CARRYING OUT THE PRESENT INVENTION

Figure 1:
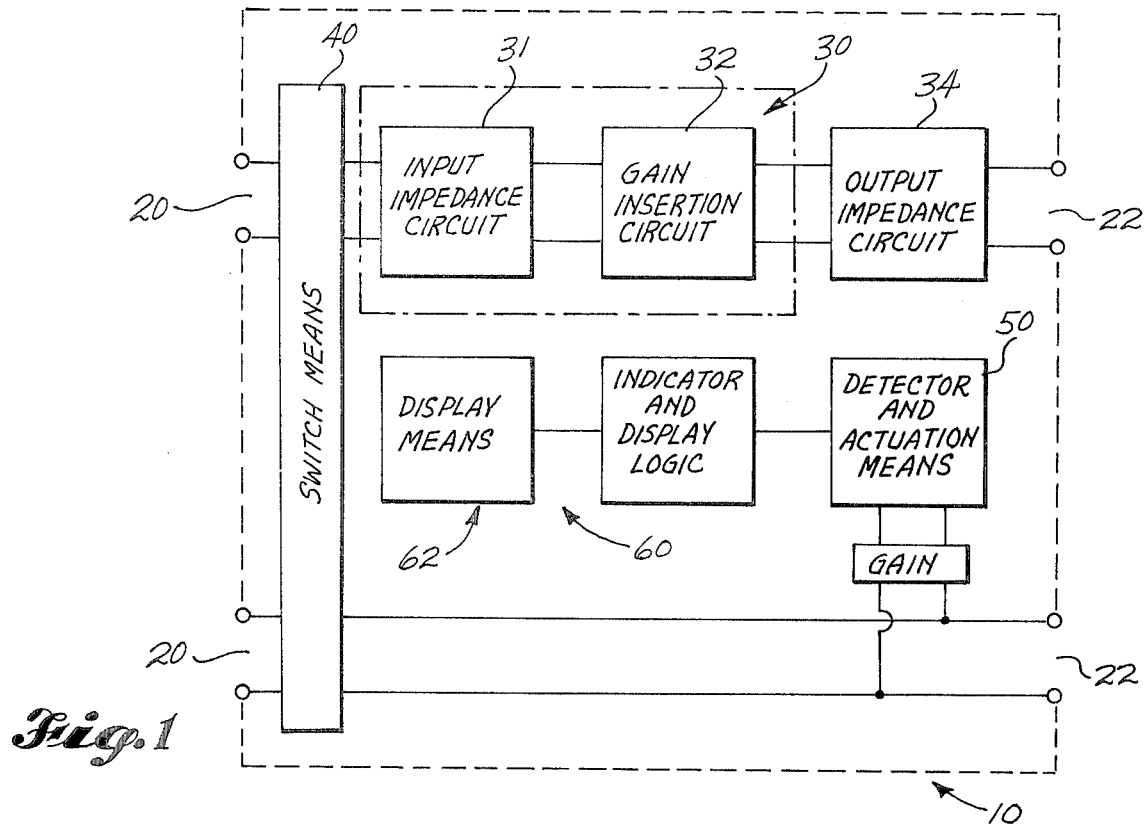
FIG. 1 is a block diagram showing a typical loop circuit interface module according to the present invention.
Figure 2:
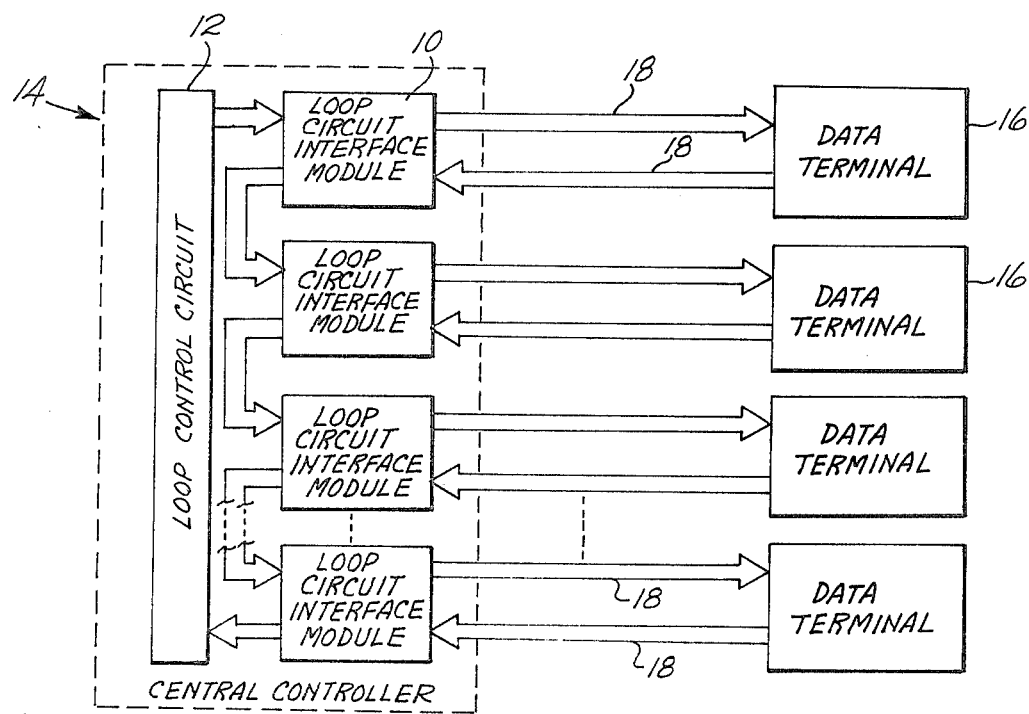
FIG. 2 is a block diagram showing a typical interconnection of plurality of loop circuit interface modules configured to communicate with a plurality of remote data terminals.
Figure 3:
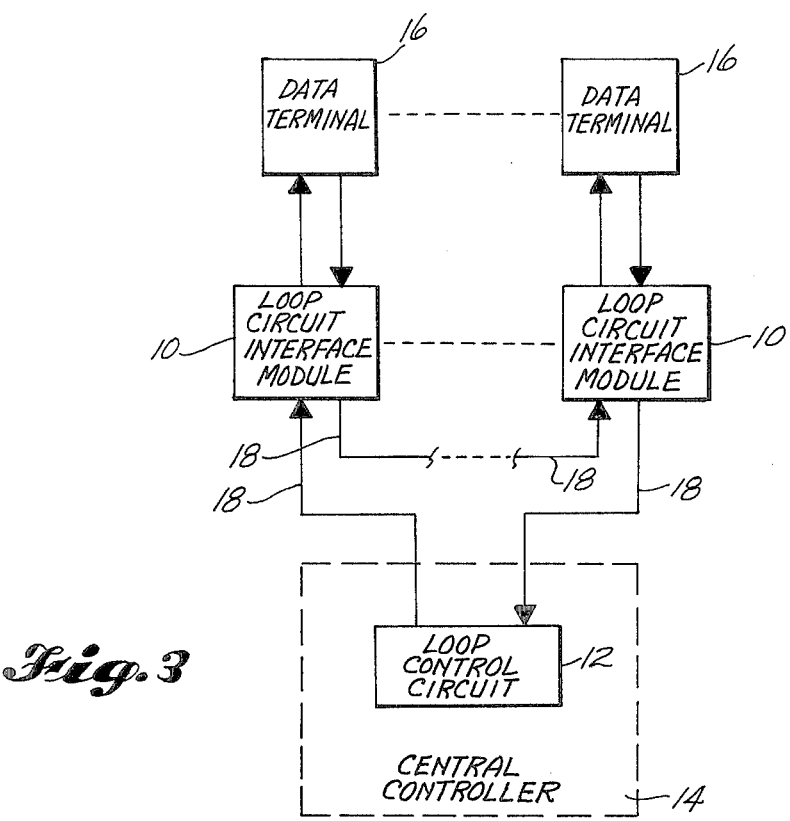
FIG. 3 is a block diagram showing another typical interconnection of a plurality of loop circuit interface modules configured to communicate with a plurality of remote data terminals.

With reference to FIGS. 1–3, the loop circuit interface module of the present invention, shown generally at 10, comprises a plurality of data ports 20 for inputting data from either a loop controller 12 or another loop circuit interface module. The loop controller generally consists of electronic circuitry within the central controller 14 and provides the interface between the central controller and the present invention. The loop controller and the central control are not part of the present invention. The plurality of ports 20 also enable the outputting of data to the loop controller or another loop circuit interface module. A plurality of signal ports 22 inputs data from a remote data terminal 16 and outputs data to the remote data terminal. Bridging means, shown at 30, provides a matched impedance between the loop circuit interface module of the present invention, the loop controller, and each of the plurality of remote data terminals. The bridging means further provides gain to the data on each of the plurality of ports 20, 22. Switching means 40 selectively and controllably connects the plurality of data ports 20 and the plurality of signal ports 22 directly to each other, or to each other through the bridging means 30. A detector and actuation means 50 enables the loop circuit interface module to detect the presence or absence of data activity at either plurality of ports 20, 22, and is further operable to output a code in response to the absence of data activity at either plurality of ports. Each of these elements, together with other elements comprising the present invention will next be described in more detail below.

With reference to FIG. 2, a plurality of loop circuit interface modules according to the present invention are shown configured to communicate with a plurality of remote data terminals 16 and a loop controller 12 within the central controller 14. In this configuration, each loop circuit interface module physically is located within the central controller while the plurality of remote data terminals are remote from each other and the central controller. Each remote data terminal is connected to the central controller and a loop circuit interface module through a plurality of bidirectional or duplex data channels 18 disposed therebetween. The duplex data channels are typically provided by a common carrier, such as American Telephone and Telegraph or some other private utility-type company. Each data channel is electrically terminated at its ends by common carrier or by customer provided modulator-demodulators converting the data signals appearing on the data channel into digital signals available for subsequent use by either the data terminals or the central controller.

In the configuration as shown, communication data is routed by the central controller to a data port 20 of one loop circuit interface module. The data routed to the module is typically in frequency shift keyed binary form having a power level of substantially 0 dBm. The switch means 40 internal to the module is manually operable by a plurality of switches on each module (see FIG. 4) to route this data through the bridging means 30 and the output impedance circuit 34 to one of the plurality of signal ports 22 for subsequent transmission to a data terminal 16 remote from the central controller. An input impedance circuit 31 within the bridging means is operable to provide a requisite impedance match between the loop controller and the module. In the preferred embodiment, the impedance circuit provides a substantially six hundred ohm load to the loop controller. A gain insertion circuit 32, also a portion of the bridging means, provides a substantially 16 dB gain to the data before it is subsequently switched to the signal port 22. The gain is needed since each common carrier provided data channel has a typical power loss of 16 dB along its length. The output impedance circuit 34 ensures the output impedance of the loop circuit interface module matches the characteristic impedance of the data channel.

Data received from a data terminal 16, also in a frequency shift keyed analong form, is applied to one of the plurality of signal ports 22. The switching means 30 is manually operable to route this data either directly to another module or to the loop controller. If the data is routed to another module, the process above is repeated until each data terminal in the loop has received communication data or has responded with data to the loop controller. It can be seen that in the configuration shown in FIG. 2, the present invention interfaces both the loop controller and the remote terminals without the need for additional expensive and complicated modulator-demodulators.

As will be discussed more fully below, each loop circuit interface module includes a detector and actuation means 50 and a display means 60 for detecting the presence or absence of data activity at the plurality of ports 20, 22 and for displaying same. In the configuration shown in FIG. 2, the detector and actuation means outputs a code in response to the absence of data activity occurring at signal port 22 after a predetermined period of time. The code is operable to control the illumination of a plurality of indicator lights (not shown) disposed on each module. By way of example, if the means 50 detects the presence of a frequency shift keyed binary one from the remote data terminal, typically at 2100 Hz, the output code illuminates a green indicator light indicating the remote data terminal is operational. If the means 50 does not detect the presence of a frequency shift keyed binary zero, typically 1300 Hz, for a period of five seconds, the output code illuminates a yellow indicator light which is an indication of a potential failure in either the loop module, the data channel, or the data terminal. The absence of either a binary one or binary zero detection for a period of five seconds illuminates a red indicator light indicating a failure in either the module, the data channel, or the remote data terminal.

When a failure has occurred, the switching means is manually operable to switch the failed component out of the communication loop and enable continued communications between the loop controller and the remote data terminals. In this instance, the switching means is operable to connect the plurality of data ports 20 directly to each other while concurrently removing, via an open circuit, the plurality of signal ports 22 from electrical connection with the module.

To ensure each loop circuit interface module in this configuration is replaceable with any other module, an attenuation module (not shown) providing a substantially 16 dB attenuation in the data routed to the first loop circuit interface module is disposed between the loop controller and the first module. In this manner, the first operable module, that is one that has not been switched so as to bypass a remote data terminal, provides substantially a 16 dB gain to the communication data prior to switching same to its associated remote data terminal.

With reference to FIG. 3, an alternate configuration for connecting a plurality of loop circuit interface modules according to the present invention is to a central controller 14 and a plurality of remote data terminals 16 is shown. In this configuration, each loop circuit interface module is located in close proximity to each remote data terminal. The loop circuit interface module is connected to another loop circuit interface module or the central controller through a plurality of bidirectional or duplex data channels 18 disposed therebetween. As previously mentioned, each duplex data channel is typically provided by the common carrier and is electronically terminated at each end by a modulator-demodulator provided by either the common carrier or the customer. The communication data propogated along the data channel is typically of frequency shift keyed analog form with a binary one being typically represented by a 2100 Hz signal and a binary zero being represented by a 1300 Hz signal.

If the loop circuit interface module and its associated remote data terminal are both operational, the switching means routes the data from the loop controller appearing at one of the plurality of data ports 20 to one of the plurality of signal ports 22 for subsequent use by the remote data terminal. The detector and actuation means 50 is switchably operable to monitor the presence or absence of data activity at the plurality of parts 20, while the bridging means 30 is switchably removed from effecting the communication data in this instance. Data from a remote data terminal appearing at one of the signal ports 22 is switched directly to one of the data ports 20 for subsequent transmission (via the modulator-demodulator at one end of the data channel) to another module or to the loop controller.

If a loop circuit interface module or its associated remote data terminal is inoperative, the switching means in conjunction with the detector and actuation means is manually operable to switch the communication data on one of the plurality of data ports 20 through the bridging means 30 to another of the plurality of data ports. The plurality of signal ports 22 are electronically removed by open circuit from electronic connection with the module. It can be seen that in this configuration, the present invention maintains continued communications between the loop controller, remote data terminals, and loop circuit interface modules without the use of additional modulator-demodulators.

In the configuration shown in FIG. 3, the switching means 40 is either manually or automatically activated to effect the switching of the communication data between a data terminal, another module, and the loop controller as described. If manually switched, personnel at the data terminal are informed of the potential inoperability of a data terminal by the plurality of indicator lights on each module as has been described. If automatically activated, the module propogates a command frequency (typically 1700 Hz) issued at a test point between the loop controller and the first data channel interconnected by loop circuit modules. The command frequency triggers the automatic operation of the switching means. A consequence of the operation of the switching means is that the command frequency is propogated to other units, and ultimately back to the loop controller. Such a process provides for an end-to-end continuity test of a series of otherwise electrically and mechanically unconnected data channels.

Figure 4:
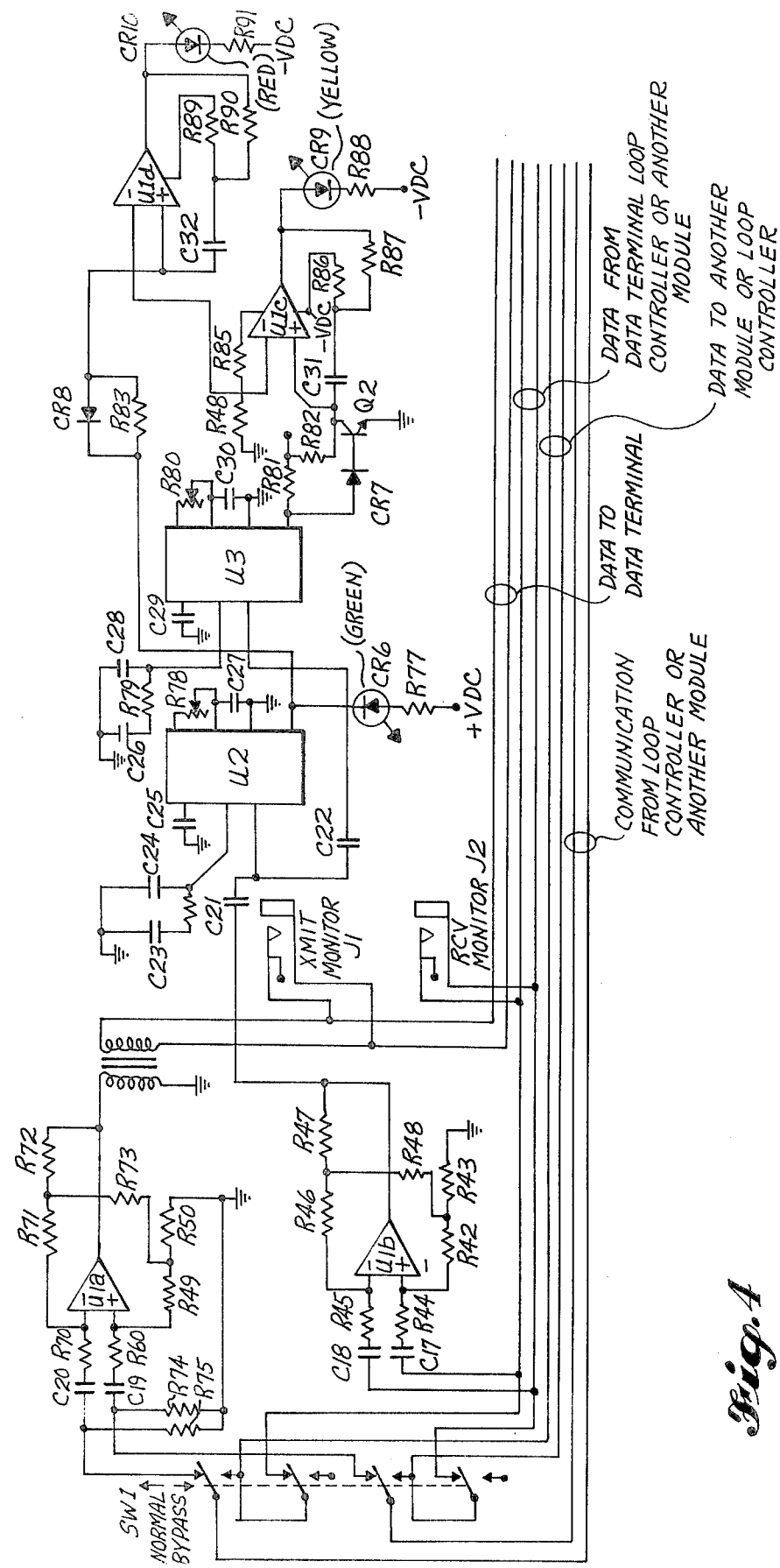
FIG. 4 is an electronic schematic diagram showing a typical implementation of the present invention.

With reference to FIG. 4 and Table 1 below, the operation of a typical loop circuit interface module will next be described. The communication data from the loop controller or another module is typically in binary form and is typically input to the present invention at a 0 dBm signal level. The signal is first passed through an attenuator to the normal-bypass switch SW1. If the switch is in the normal mode, the signal is then passed through differential amplifier U1A. The input to the differential amplifier utilizes two three hundred ohm resistors, R74, R75 forming a balanced, input for the amplifier while maintaining a typical six hundred ohm input impedance for the module. Bypass capacitors C19, C20 isolate any DC signal appearing on the communication signal input while maintaining the bias signals required by amplifier U1A. The bias for the amplifier U1A is provided by the plurality of resistors R49, R50, R70, R71, R72, and R73. The gain of the differential amplifier can be varied by adjusting the value of resistor R73. The output of the amplifier stage is connected to the primary side of a coupling transformer T1. The secondary of the transformer is connected in parallel to a monitoring jack J1 and subsequently to a remote data terminal. The monitoring jack J1 permits the audio monitoring of the signal switched to the data terminal.

Data received from a remote data terminal is switchable by SW1 directly to either another loop control interface module or the central controller. In this instance, the signal merely is routed directly by switch SW1 to these units (without amplification). In this instance, the signal will be substantially at a 16 dBm level.

In the instance when a remote data terminal has failed or is otherwise rendered inoperable, the switch SW1 is manually switchable to the bypass position. In this manner, the communication data from the loop controller or another remote data module is switched directly to another data module or back to the loop controller. The plurality of monitor jacks J2 allow the monitoring of the data channel communication data without any interference from any other signals and the performance of testing on the data channel. An additional feature of the jacks is that in a normal operation it becomes possible to listen to the communication data on the data channels without interference to the communication data.

The operation of the detector and actuation means will next be described. Communication data received from a remote data terminal, loop controller or another module is applied to a differential amplifier U1B operationally configured similarly to amplifier U1A described above. The output of amplifier U1B is routed through a blocking capacitor C21 to tone decoders U2 and &3 tuned typically to 2100 Hz and 1300 Hz respectively. Tuning for each is provided by resistors R78 and R80 respectively. When a 2100 Hz tone is detected, light emitting diode CR6 is biased on causing a green indicator to be lit. If a 2100 Hz tone is not detected, charging current provided by the detector U2 leaks through resistors R77, R83, and diode CR6 charging capacitor C32. A comparator U1D is thereafter biased into conduction causing light emitting diode CR 10 to conduct illuminating a red indicator light. This light indicates no received data. The conduction process takes approximately five seconds due to the charging of capacitor C32. A similar circuit is provided for the detection of a 1300 Hz tone. In the absence of a 1300 Hz tone transition for approximately four seconds, comparator U1C will cause light emitting diode CR9 to conduct illuminating a yellow indicator indicating the absence of normal 1300–2100 Hertz transitions. This condition signifies a constant 2100 Hertz tone, which is sent by loop terminals which are not receiving valid communication.

TABLE 1

| REFERENCE DESIGNATION | DESCRIPTION |
| --- | --- |
| R1, R2, R4, R6, R9, R81, R84, R85, R87, R90 | 10KΩ ¼w ± 5% Carbon |
| R10, R3, R82, R83 | 30KΩ ¼w ± 5% Carbon |
| R12, R5, R86, R89 | 1KΩ ¼w ± 5% Carbon |
| R8, R7, R78, R80 | 10KΩ Trimmer Potentiometer |
| R13, R11, R76, R79 | 4.7KΩ ¼w ± 5% Carbon |
| R14, R15, R17, R18, R19, R20, R23, R24, R25, R26, R27, R28, R42, R43, R44, R45, R46, R47, R49, R50, R60, R70, R71, R72 | 100KΩ ¼w ± 5% Carbon |
| R16, R29, R48, R73 | 110KΩ ¼w ± 5% Carbon |
| R21, R22, R74, R75 | 300Ω ¼w ± 5% Carbon |
| R30, R77 | 330Ω ¼w ± 5% Carbon |
| R40, R88 | 660Ω ¼w ± 5% Carbon |
| R41, R91 | 720Ω ¼w ± 5% Carbon |
| C1, C4, C31, C32 | 100μF 20V Electrolytic, Type 500 D |
| C2, C3, C8, C12, C13, C14, C15, C16, C17, C18, C19, C20, C21, C22, C27, C30 | 0.1μF 20V Capacitor |
| C5, C9, C25, C29 | 2.2μF 20V Dipped Tantalum, Type 196D Electrolytic |
| C7, C10, C23, C26 | 220μF 20V Electrolytic, Type 500 D |
| C11, C6, C24, C28 | 1μF 20V Electrolytic, Type 196 D |
| CR1, CR4, CR7, CR8 | IN 914 Diode |
| CR2, CR10 | Red LED |
| CR3, CR9 | Yellow LED |
| CR5, CR6 | Green LED |

TABLE 1-continued

| REFERENCE DESIGNATION | DESCRIPTION |
| --- | --- |
| Q1, Q2 | 2N3904 |
| U1, U5, | LM 324 Quad op amps |
| U2, U3, U6, U7 | LM 567 Tone Decoder |
| J1, J2, J3, J4 | Miniature Phone Jack, Switch Craft 142A |
| SW1, SW2 | 4 pole double throw switch, toggle type bushing size .25 inches O.D. |
| T1, T2 | Telephone coupling transformers 900Ω primary 600Ω secondary, Triad TY-301P |
| CR1-4 | Bridge Rectifier, PD20EDI7811 |
| C1 and C2 | Capacitors-470 mF 50 Volt Electrolytic |
| C3 and C4 | 100μF 20 Volt Electrolytic Capacitor |
| CR4-5-6 | Red LED |
| R1 and R2 | 330 Ω ¼ watt 5% Carbon |
| R3 | 4K 5Watt resistor-wire wound |

I claim:
1. A loop circuit interface module enabling a plurality of data terminals remote from each other and from a central loop controller to communicate with each other and the central controller over a plurality of data channels interconnecting same, the said loop circuit interface module comprising:
 (a) a plurality of data ports for inputting data from either the loop controller or another loop circuit interface module, and for outputting data to the loop controller or another loop circuit interface module;
 (b) a plurality of signal ports for inputting data from the data terminal and for outputting data to the data terminal;
 (c) bridging means providing a matched impedance between said loop circuit interface module, the loop controller, and the data terminals, said bridging means further providing gain to the data on said plurality of ports; and,
 (d) switching means selectively and controllably connecting said plurality of data ports and said plurality of signal ports directly to each other, or to each other through said bridging means.

2. The loop circuit interface module of claim 1 further including detector and actuation means enabling said loop circuit interface module to detect the presence or absence of data activity at said plurality of data and signal ports, said means being further operable to output a code in response to the absence at said plurality of ports.

3. The loop circuit interface module of claim 2 wherein the code output in response to the absence of data activity is operable to control a plurality of indicator lights on said loop circuit interface module.

4. The loop circuit interface module of claim 1 wherein said switching means is manually operable.

5. The loop circuit interface module of claim 1 wherein said switching means is operable to switch data from either the loop controller or another loop circuit interface module through said bridging means to a data terminal, and data from a data terminal to either the loop controller or another loop circuit interface module.

6. The loop circuit interface module of claim 1 wherein said switching means is operable to switch data from either the loop controller or another loop circuit interface module to same, and to disconnect said plurality of signal ports from said module.

7. The loop circuit interface module of claim 1 wherein said switching means is operable to switch data from the loop controller or another loop circuit interface module directly to a data terminal, and data from a data terminal to either the loop controller or another loop circuit interface module.

8. The loop circuit interface module of claim 1 wherein said switching means is operable to switch data from a loop controller or another loop circuit interface module through said bridging means to same, and to disconnect said plurality of signal ports from said module.

9. The loop circuit interface module of claim 1 wherein the gain provided by said bridging means is substantially 16 dB.

10. The loop circuit interface module of claim 1 further including means insertable between said plurality of data ports and the loop controller providing substantially 16 B attentuation in the data input to said module.

11. An interface module interconnecting a plurality of data terminals to each other and a central controller, said module comprising:
 (a) a plurality of input ports for receiving data from either the central controller or another interface module;
 (b) a plurality of output ports for communicating data signals to either the central controller or another interface module;
 (c) a plurality of transmit and receive ports for communicating data between said module and a data terminal;
 (d) bridging means providing an impedance match between each of said interface modules, the central controller, and the remote terminals, said bridging means further providing a gain to data received from the central controller or another interface module; and,
 (e) switching means selectively and controllably connecting said plurality of input ports to said plurality of output ports, or to said plurality of transmit and receive ports, said means being further controllable to connect said bridging means therebetween.

12. The interface module of claim 11 further including detector means for detecting the presence or absence of received data, and outputting a code in response to the absence of such activity.

13. The interface module of claim 12 wherein said code is operable to control a plurality of indicator lights on said module.

14. The interface module of claim 11 wherein said switching means is manually operable.

15. The interface module of claim 11 wherein said switching means is operable in response to data received from the central controller or from another interface module.

16. The interface module of claim 11 wherein said switching means is operable to switch data received from either a central controller or another interface module through said bridging means to a data terminal, and data communicated from the data terminal to either the load controller or another interface module.

17. The interface module of claim 11 wherein said switching means is operable to switch data received from either the central controller or anther interface module to same, and to disconnect said plurality of transmit and receive ports from said module.

18. The interface module of claim 11 wherein said switching means is operable to switch data received from either the central controller or another interface module to said plurality of transmit and receive ports, and data communicated from a data terminal to either the central controller or another interface module.

19. The interface module of claim 11 wherein said switching means is operable to switch data received from either the central controller or another interface module through said bridging means to same, and to disconnect said plurality of transmit and receive ports.

20. The interface module of claim 11 wherein the gain provided by said bridging means is substantially 16 dB.

21. The interface module of claim 11 further including means insertable between said module and essential controller or another interface module, said means providing substantially a 16 dB attentuation in the data received by said module.

* * * * *